United States Patent [19]

House

[11] Patent Number: 4,962,826

[45] Date of Patent: Oct. 16, 1990

[54] DAMPING TREATMENT FOR PIPES AND BODIES

[75] Inventor: John R. C. House, Wimbourne, England

[73] Assignee: The Secretary of State for Defence in Her Britannic Majesty's Government of the United Kingdom of Great Britain and Northern Ireland, London, Great Britain

[21] Appl. No.: 340,300

[22] PCT Filed: Nov. 4, 1987

[86] PCT No.: PCT/GB87/00779

§ 371 Date: Apr. 4, 1989

§ 102(e) Date: Apr. 4, 1989

[87] PCT Pub. No.: WO88/03628

PCT Pub. Date: May 19, 1988

[30] Foreign Application Priority Data

Nov. 5, 1986 [GB] United Kingdom ............... 8626408

[51] Int. Cl.$^5$ ............................................. F16F 15/00

[52] U.S. Cl. ..................................... 181/207; 181/208; 181/296; 60/322

[58] Field of Search ................................ 181/207–209, 181/202, 296; 60/322

[56] References Cited

U.S. PATENT DOCUMENTS

| | | | |
|---|---|---|---|
| 1,063,385 | 6/1913 | Reed | 181/207 |
| 3,314,503 | 4/1967 | Neubert | 181/207 X |
| 3,640,833 | 2/1972 | Oberst et al. | 181/290 X |
| 4,096,307 | 6/1978 | Lagowski | 181/290 X |

Primary Examiner—Benjamin R. Fuller
Attorney, Agent, or Firm—Nixon & Vanderhye

[57] ABSTRACT

A damping treatment for bodies where the temperature may rise above 150° C. consists of a number of stand-off cantilever, sandwich type dampers (1), consisting of a layer of viso-elastic material (3) sandwich between two rigid metal plates (4, 5), which are attached to a support (2) that can be attached to the body (7). The support (2) is thermally isolated from the body (7) and is positioned at a position of high amplitude of a radiating frequency that is to be reduced.

12 Claims, 7 Drawing Sheets

DAMPING TREATMENT FOR PIPES AND BODIES

The invention relates to vibration damping, particularly, but not exclusively, to the damping of high temperature pipes and bodies.

Vibrations in pipes, machines and other bodies cause movement and noise which it is often desirable to reduce or eliminate by damping of the vibrations.

Many damping techniques are known, but the need for a lightweight, effective means for damping bodies becomes more difficult to achieve as the temperature of the body increases.

Free layer damping, in which a layer of visco-elastic material is applied to the substrate (pipe or body surface), or stave/constrained layer damping, in which the visco-elastic layer has a stiff outer layer, cannot be used if the temperature of the body rises above about 150° C. as both these techniques require the application of the viscoelastic polymer to the substrate. Polymer properties vary with temperature and/or frequency. Generally, at low temperatures or high frequencies a polymer will appear brittle or glassy wwith little visco-elastic loss. At high temperatures or low frequencies it will appear rubbery and elastic. Between these two extremes the polymer is visco-elastic and able to absorb energy. A polymer for noise reduction purposes is, therefore, selected or designed to have its visco-elastic properties in the particular frequency and temperature range of interest. However, it is difficult to obtain polymers capable of withstanding temperatures of above about 140°-150° C. for long periods of time. Vibration is imparted to the walls of a pipe or other body as radial or lateral motion and this has been damped in some applications where high temperatures are not experienced by using auxiliary mass type dampers. There are many situations, however, where temperatures of 500°-600° C. may be experienced and a means to damp bodies at these high temperatures is required.

The object of the invention is to provide a means for damping and a method of applying such means for the treatment forr pipes and other bodies which can be used even where the temperature of the body may rise above 150° C.

It is a further object of the invention to provide such a means which is lightweight and can easily be applied to a pipe or body in situ.

In one aspect the invention provides a means for damping pipes and other bodies comprising one or more stand-off cantilever, sandwich-type dampers adapted to be attached to the body and wherein the dampers are thermally isolated from the body.

A cantilever damper is a damper in which the mode of vibration of the damper is a cantilever type ie a bar allowed to bend either side of a central support. A cantilever, sandwich-type damper is an auxiliary mass type damper which comprises a layer of visco-elastic material sandwiched between two rigid plates, with one plate being adapted for attachment to a body. Other cantilever dampers have no visco-elastic component and work by phase interaction with the structure. Resonant peaks of vibration are set up and the dampers are tuned to work at one frequency only. The construction of a damper having a visco-elastic polymer in a sandwhich of rigid plates allows a broader band performance and energy is actually absorbed by the damper.

Preferably the dampers are attached to a support which is then attached to the surface of the pipe or body to be damped, the support being thermally insulated from the body by a layer of insulating material. This configuration facilitates the incorporation of a thermal barrier for application to high temperature bodies.

The thickness of the insulating layer determines the temperature gradient between the body and the damper. The higher the temperature of the body, the thicker the insulation layer must be to avoid the damper being raised to a temperature which will damage the viso-elastic material. Any suitable insulating material can be used. Advantageously the insulation is rigid or nearly rigid to ensure efficient coupling between the vibrating body and the dampers.

Preferably each cantilever damper support is attached to the body at a position of high amplitude of a radiating frequency in the range of interest. These positions of high amplitude are selected to have the maximum influence on the vibrational modes which are to be reduced or eliminated.

Preferably the visco-elastic material is a polymer capable of withstanding temperatures of over 130° C. Advantageously it should be capable of withstanding temperatures of 150° C., or higher if possible.

The thickness of the layer of visco-elastic polymer is preferably the minimum possible for adequate damping performance, so that the weight of the dampers is kept as low as possible.

Advantageously the damper is tuned so as to have a resonance frequency corresponding to a particular frequency to be damped. Preferably the damper is tuned to a frequency slightly lower than that to be damped. This is because addition of extra mass to a structure tends to lower the resonant frequency of the structure.

The most convenient way of tuning the damper is to alter the length of the rigid plates sandwiching the visco-elastic polymer.

The damper plates can be made of any material with suitable rigidity and density, including non-metallic materials. However, metals are the most convenient materials to use for a number of reasons such as cost, ease of use etc. Preferably the plates are made of stainless steel.

The support is preferably rigid to enable good coupling of the vibrational energy to the damper and is adapted for easy attachment to the body to be damped. If the body is a pipe, the support conveniently consists of a metal, preferably steel, hoop in two or more pieces which can then be clamped together around the pipe. For more complicated shapes of body, the support is preferably of a form which enables easy fitting to the body such as straight or shaped bars which can be clamped together around the body. An alternative support for any shaped body consists of linked metal plates in a chain, with insulating material on one face of the plates and the dampers attached on the other face such that the plates can be fastened around the body by attaching the ends of the chain together.

Preferably each damper is attached to the support at its midpoint. The dampers may be attached by any suitable means such as bolts, welding etc.

Advantageously more than one damper is attached to each support. For maximum damping effect it is preferable that as many dampers as possible are attached to each support.

As it is possible to attach more dampers to a larger support, it follows that improved levels of damping can be achieved for larger bodies having the same vibrational levels as smaller ones.

In a second aspect, the invention provides a method for damping pipes and other bodies comprising the application of one or more thermally isolated, stand-off cantilever, sandwich-type dampers to the body.

The method for damping pipes and other bodies by application of one or more thermally isolated, stand-off cantilever dampers to the body preferably includes the steps of:

(1) identifying the positions of maximum amplitude of the vibrational modes of interest; and (2) selecting one or more tuned cantilever dampers suitable for damping the required vibrational modes.

In order to assist in identifying the modes of vibration of interest, the method preferably includes the further steps of:

(a) identifying the frequencies to be damped; and (b) identifying the modes of vibration of the body for the frequencies to be damped.

So that the appropriate insulation material may be selected, the further step of identifying the maximum temperatures that the body will experience is preferably included and the thickness of insulation material needed to give the required temperature drop between the body and the damper is calculated.

Conveniently the frequency response of the body is investigated using a spectrum analyser. A modal analysis of the modes of vibration for the frequencies of interest can then be made using a suitable computer software package. This is conveniently used to find the positions of maximum amplitude of the vibrational modes of interest.

Preferably the dampers are thermally isolated from the body by means of an insulation material selected to be as efficient as possible so that the required temperature drop can be achieved using as little of the insulation material as possible.

In order that the invention may be more fully understood it will now be described, by way of example only, with reference to the attached drawings of which.

Figure 1:
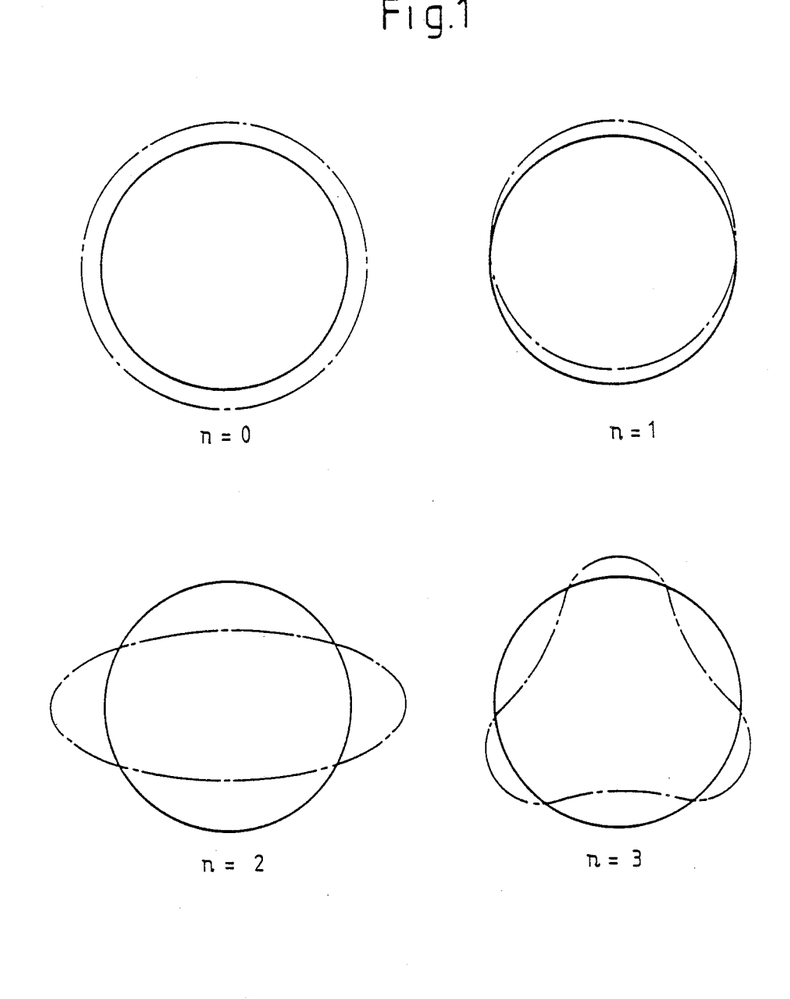
FIG. 1 shows four possible modes of vibration of a pipe.

In order to be able to damp vibrations in a body efficiently, some idea of the way in which the vibrations occur is required. FIG. 1 shows the first four modes of vibration of a pipe. n=0 is a bulge type mode, n=1 is a bending mode and n=2 and n=3 are possible breathing type modes. In each case, radial motion is imparted to the pipe walls and can thus be damped by auxiliary mass type dampers. A bending mode is one where the tube bends in a particular vibration pattern. In bulge and breathing type modes the tube expands radially in and out.

Figure 2A:
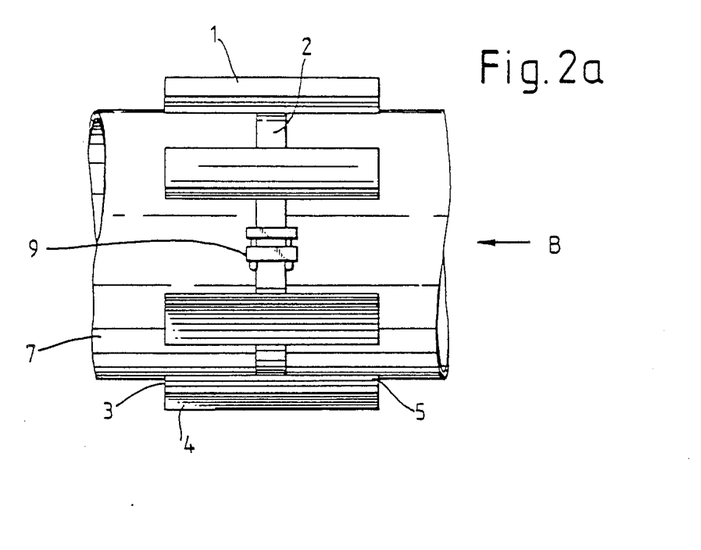
FIGS. 2a & b show, in side view and end on (in the direction of arrow B) respectively, a damping treatment according to the invention, fixed on to a pipe.
Figure 2B:
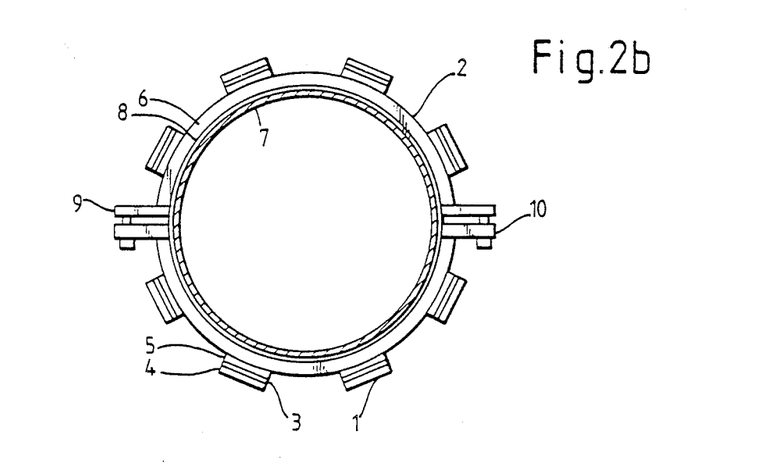

A damping treatment according to the invention is shown in FIGS. 2a & b. Eight of dampers 1 are circumferentially arranged around a pipe 7, each damper being attached to a circular support 2. Each damper 1 consists of a layer of visco-elastic polymer 3 sandwiched between two steel plates 4,5. Any polymer with the correct visco-elastic properties can be used, though consideration must also be given to the environmental requirements eg water uptake or degradation by oil of the polymer. The polymer layer 3 is about 3 mm thick. The support 2 consists of a split steel hoop 6, thermally insulated from the pipe 7 by a 5 mm layer of rigid insulation 8. This thickness was found to be sufficient to keep the viso-elastic layer 3 to about a third of the temperature of the pipe 7 so the treatment can be used on pipes of temperatures of about 400° C. As many dampers 1 as is convenient are bolted to the hoop 6—in this case, there are 8. The two halves of the hoop 6 are held together around the pipe 7 by clamps 9,10.

The steel plates 4,5 are about 6 mm thick. The damper assembly 1, in this particular case, is about 190 mm long. It is tuned to damp a particular frequency by altering the length of the plates 4,5. The length of plate required to damp a particular frequency depends on the thickness and the physical properties of the plates and the visco-elastic polymer layer. The size of the damper determines the frequency of operation. The damping in such a system is given by:

$$z_s = \frac{\beta Y g(1 + k_3)}{1 + (2 + Y)g(1 + k_3) + (1 + Y)(1 + \beta^2) g^2 (1 + k_3)^2}$$

where $\beta$ is the loss factor of the visco-elastic layer
$g(1+k_3)$ is the shear parameter
For constrained layer treatments for which the extensional stiffness of the damping layer is negligible:

$$Y = \frac{3 e_3 h_3 (1 + 2h_2 + h_3)^2}{(1 + e_3 h_3)(1 + e_3 h_3)}$$

$$g = \frac{G_2}{K_3 H_2 w} \sqrt{\frac{B_1}{m_1}} \sqrt{\frac{(1 + e_3 h_3^3)(1 + kY)}{1 + d_2 h_2 + d_3 h_3}}$$

where
$B_1$ = flexural rigidity of the base plate (bottom plate)
$m_1$ = mass per unit area of the base plate
$G_2$ = shear modulus of damping layer
$K_3$ = extensional stiffness of the constraining layer (top plate)
$H_2$ = thickness of damping layer
$w$ = angular frequency
$k_3$ = extensional stiffness of constraining layer relative to that of the base plate
$e_3$ = Young's Modulus of constraining layer relative to base plate
$h_2$ = thickness of damping layer relative to base plate
$h_3$ = thickness of constraining layer relative to base plate
$d_2$ = damping layer density
$d_3$ = density of constraining layer.

α is a function of the shear parameter and the viscoelastic loss factor of the layer and is taken to be equal to 1 in this case.

The length of the plates is, however, preferably not more than about 500 mm to keep the size and weight of the damper to a minimum.

A visco-elastic polymer composition which can been found to be suitable in this application is shown in Table 1, though any suitable material may be used.

TABLE 1

| INGREDIENTS | PROPORTION BY WEIGHT |
|---|---|
| Butadiene-Acrylonitrile Rubber | 100 |
| Stearic Acid | 1 |
| Zinc Oxide | 5 |
| SRF Carbon Black | 5 |
| Mica | 150 |
| Tetramethyl thiuram disulphide | 1.4 |
| Sulphur | 0.2 |
| Di-morpholini-disulphide | 1.4 |
| Non toxic plasticiser | 10 |
| Acetone/diphenylamine condensation product | 2 |

For damping of a pipe or a series of pipes, the frequencies to be damped have to be found. Each length of pipe has different resonant frequencies. Typical bending wave (vibrational) frequencies for a pipe are given by:

$$f_1 = \frac{\pi}{2l^2} \sqrt{\frac{Ek^2}{\rho}}$$

assuming the pipe to be simply supported at the ends, and where:
l = length of pipe
E = Young's Modulus of the pipe material
ρ = density of the pipe material $$k = \frac{\sqrt{(a_1^2 + a_2^2)}}{2}$$

$a_1$ = internal radius of pipe
$a_2$ = external radius of pipe
The 2nd and 3rd overtones are given by:
$f_2 = 4f_1$ and $f_3 = 9f_1$ The following table (Table 2) shows the frequencies at which the first four overtones may occur for different lengths of pipe:

TABLE 2

| | $a_1$ = 150 mm $a_2$ = 140 mm: | | | |
|---|---|---|---|---|
| length/m | $f_1$ | $f_2$ | $f_3$ | $f_4$ |
| 0.5 | 3.08 kHz | 12.3 kHz | 27.8 kHz | |
| 1.8 | 238 Hz | 952 Hz | 2.14 kHz | |
| 2.0 | 192 Hz | 771 Hz | 1.74 kHz | 3.07 kHz |
| 3.0 | 85 Hz | 342 Hz | 769 Hz | 1.37 kHz |
| 4.0 | 48 Hz | 192 Hz | 433 Hz | 770 Hz |

There are also other, more complicated, modes of vibration that may radiate.

If the pipe is in water, the radiation depends on the bending wave velocity being above the wave velocity in water (typically 1480 mS$^{-1}$). Typical wave velocities for bending waves are given by:

$$c_B = \sqrt[4]{\frac{(2\pi f)^2 Ek^2}{\rho}}$$

Below about 700 Hz the bending wave velocity is <1480 mS$^{-1}$ and should not radiate. Thus in water, damping treatments may only need to be designed to deal with frequencies of greater than about 700 Hz.

Figure 3:
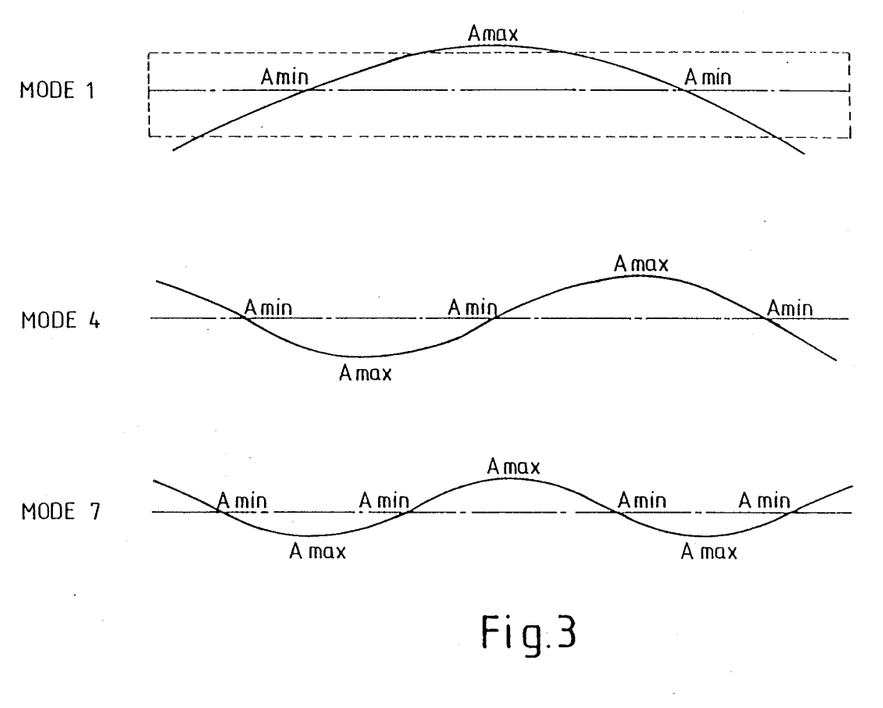
FIG. 3 illustrates the positions of high amplitude and of the nodal points of a pipe for simple bending modes of vibration.

For optimum performance, one or more supports 2 carrying the dampers 1 are sited at positions of maximum displacement of the pipe 7. FIG. 3 shows the points of maximum and minimum amplitude ($A_{max}$ and $A_{min}$ respectively) for typical vibrational bending modes 1, 4 and 7 of a pipe, with mode 1 corresponding to the fundamental frequency of the pipe. The positions of $A_{max}$ and $A_{min}$ are determined by the tube length, radius and wall thickness.

Figure 4:
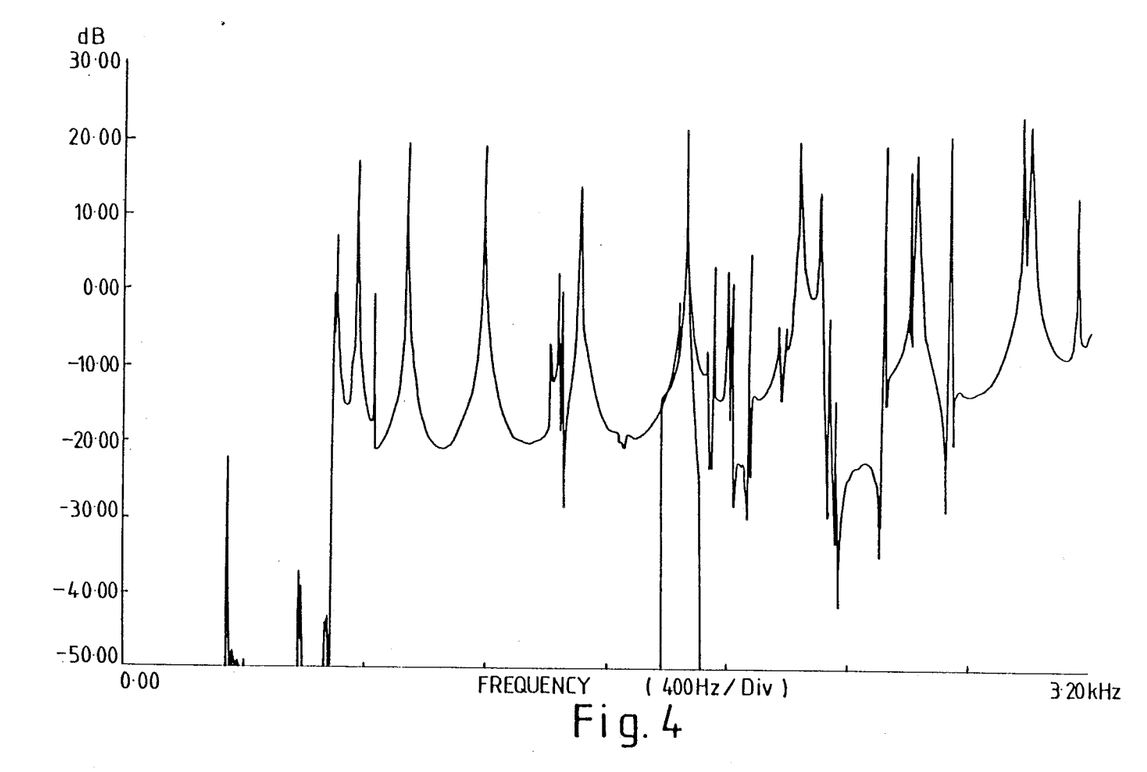
FIG. 4 shows a typical frequency response for an untreated pipe (range on the vertical axis: −50.00 to +30.00 dB)

FIG. 4 shows a typical frequency response of a steel pipe measuring 2 m long and having a diameter of 0.24 m with 25 mm thick walls. The pipe was mounted on compliant knife edges and its frequency response over the range 0 to 3.2 kHz was investigated using a spectrum analyser.

Although sounds are audible to the human ear in air over a wide frequency range of about 0.02–20 kHz, the ear is most sensitive to sound at about 1 kHz. The damping treatment was designed to deal mainly with frequencies in the 1 kHz–2 kHz range. Three rings 2 each supporting eight cantilever damping elements 1, as shown in FIGS. 2a & b, were applied to the pipe 7, at positions of high amplitude, as shown in FIG. 3. The three rings 2 were attached at (a) 0.45 m, (b) 1 m and (c) 1.55 m from one end of the pipe 7. These are positions of high amplitude for mode 7, which is also a radiating frequency central to the range of interest. The dampers at positions (a) and (c) also have an effect on mode 4, while those at position (b) have little effect on mode 4, but have a large effect on mode 1.

Figure 5:
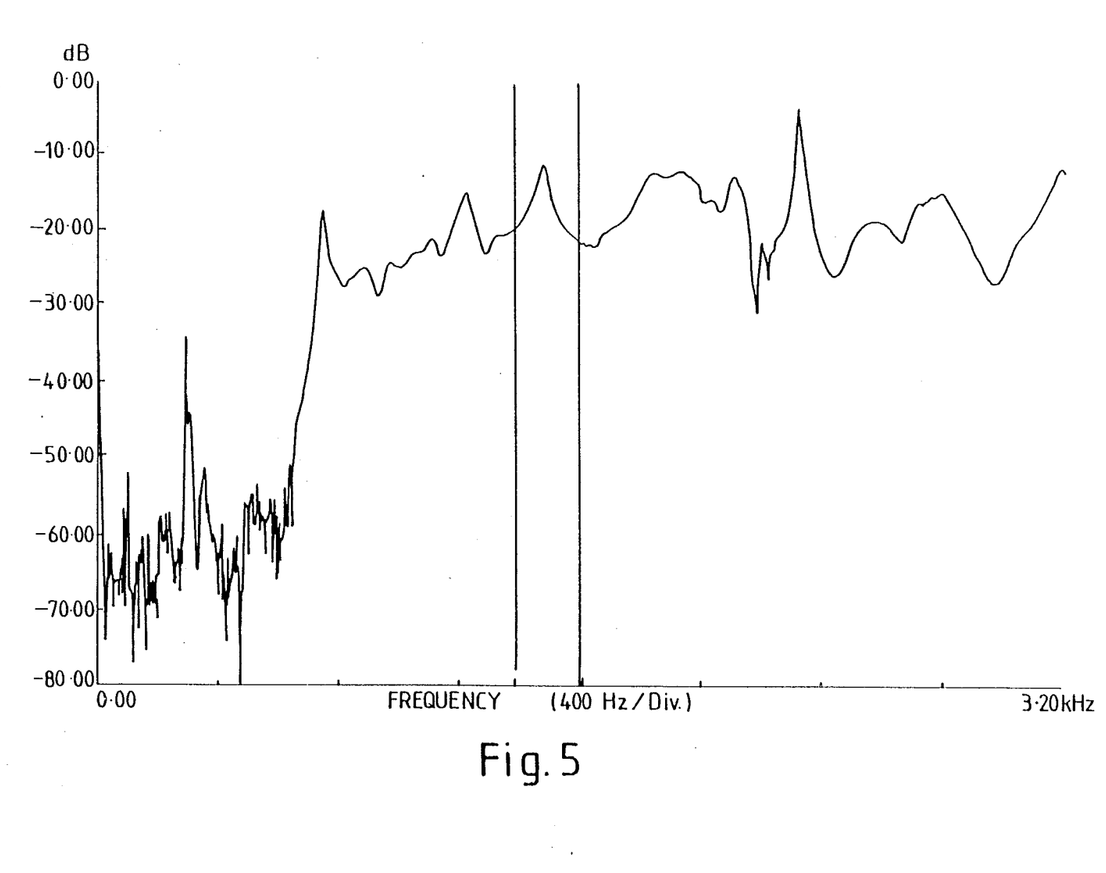
FIG. 5 shows the frequency response of the same pipe as in FIG. 4 when damped (range on the vertical axis: −80.00 to 0.00 dB)

The vibration response of the treated pipe is shown in FIG. 5. There is a 30 dB on the vertical axis, which shows noise intensity, in comparison with the untreated case shown in FIG. 4 and it can be seen that peak noise radiation levels were reduced by around 20 dB above 1 KHz.

Although the treatment increases the pipe damping substantially from 1 to 1.5 kHz, there is still significant damping at frequencies below and above this range.

Figure 6A:
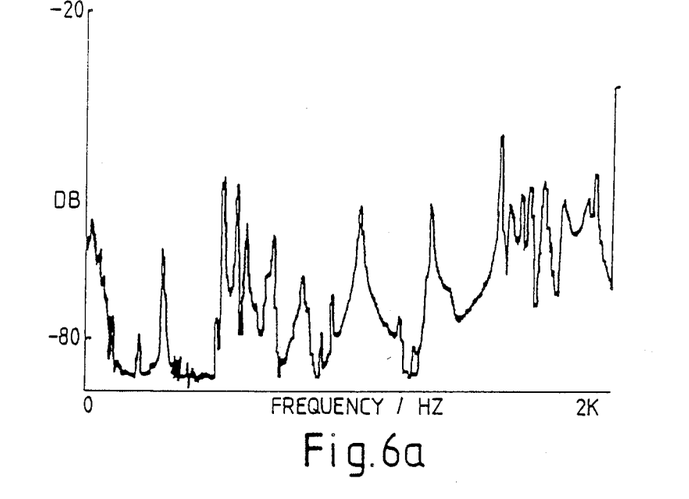
FIGS. 6a & b show the frequency response in water of the same pipe as in FIG. 4, undamped and damped respectively.
Figure 6B:
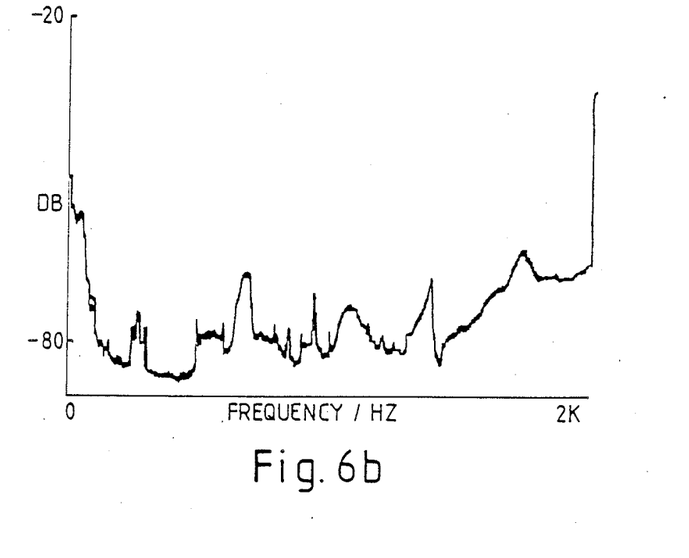
Figure 7A:
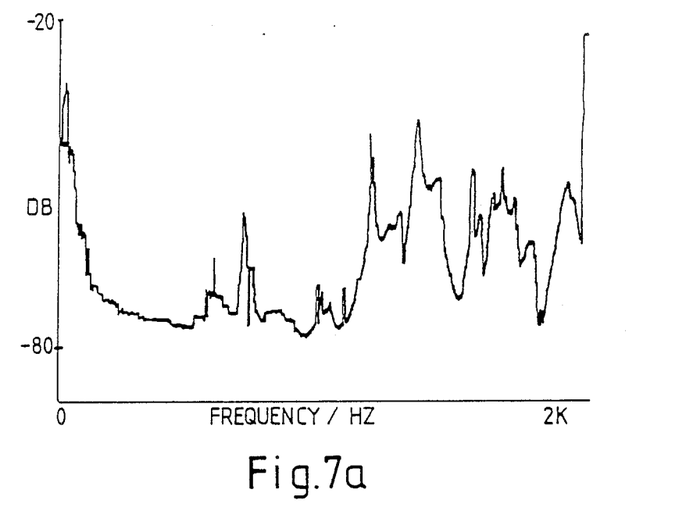
FIGS. 7a & b show the noise radiation for the respective frequency responses of FIGS. 6a & b.
Figure 7B:
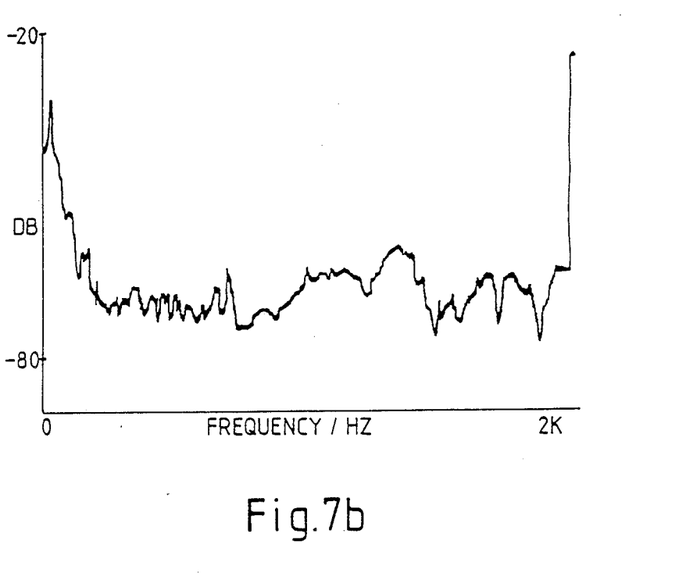

FIGS. 6a & b, respectively, show the frequency response of the same pipe as described with respect to FIG. 4, immersed in water and before and after the damping treatment as described with respect to FIG. 5. Comparison of FIGS. 4 and 6a shows that the water loading decreases the frequencies of the individual peaks. After treatment, FIG. 6b, the peak values have been reduced considerably. Reduction of the radiated noise is illustrated by FIGS. 7a and b which show noise radiation measurements made with a hydrophone both before and after treatment. The frequency of mode 1 is measured as about 300 Hz in water and hence, as expected, this mode does not radiate measurably Modes above about 600 Hz do however and it can be seen that the application of the dampers to the pipe has reduced the peak noise radiation levels by around 20 dB above 1 kHz.

The damping treatment is easily installed and removed and can be tuned to be effective over a given range of frequencies. It is lightweight and compact and is particularly useful for damping objects which may reach high temperatures. Although described with reference to a cylindrical pipe it may be applied to other bodies.

Although the damper plates have been described as being made of steel, they can be made of any material of suitable rigidity and density. Metals other than steel can be used and also any non-metallic material which can fulfil the requirements.

If the pipe or body is in a medium which acts as a coolant, such as water, the damping treatment is even more effective as the damper temperature is relatively lower ie it is at approximately the same temperature as the surrounding medium.

Although there are other techniques for damping pipes and bodies at temperatures below about 130° C., when visco-elastic polymers can be used, this technique is easier to apply and is more weight effective (ie lighter) than most other techniques. In addition, there are other techniques known for damping flat plates, frames, machines etc but skilled use of the present types of absorbers gives a more effective and lighter treatment. However, for body temperatures above about 130° C. no other suitable effective and lightweight techniques are known. This technique is thus suitable for exhaust pipes, high temperature machines, pipes carrying hot liquids or gases and so on.

I claim:

1. A vibration damper for hot pipes, said pipes having a maximum temperature, said damper comprising:
   two rigid plates, said plates having a length;
   a layer of viscoelastic material disposed between said two rigid plates;
   support means connected to one of the plates, for attaching said one plate to the said pipe; and
   a thermally insulating barrier means, disposed in a thermal path between said viscoelastic material and said pipe, for preventing temperature induced inefficiency of the visoelastic materials damping characteristics.

2. A vibration damper as claimed in claim 1 wherein said viscoelastic material is a viscoelastic polymer.

3. A vibration damper as claimed in claim 1 wherein said pipe has positions of high amplitude of a radiating frequency and each support means is attached to said pipe at said position of high amplitude of a radiating frequency.

4. A vibration damper as claimed in claim 1 wherein said two rigid plates are made of steel.

5. A vibration damper as claimed in claim 1 wherein said damper has a resonance frequency corresponding to a particular frequency to be damped.

6. A vibration damper as claimed in claim 1 wherein said damper has a resonant frequency below a particular frequency to be damped.

7. A vibration damper as claimed in claim 1 wherein said damper has a resonant frequency and said resonant frequency is changed by altering the length of the rigid plates.

8. A vibration damper as claimed in claim 1 wherein said support means is rigid to enable efficient coupling of vibrational energy between the pipe and damper.

9. A method of damping the vibrational energy of a hot pipe, said pipe having a maximum temperature, comprising the steps of:
   providing two rigid plates, said plates having a length;
   providing a layer of viscoelastic material disposed between said two rigid plates;
   providing support means connected to one of the plates for attaching said one plate to the said pipe;
   providing a thermally insulating barrier means, disposed in a thermal path between said viscoelastic material and said pipe, for preventing temperature induced inefficiency of the viscoelastic materials damping characteristics; and
   attaching said support means to said pipe.

10. A method of damping as claimed in claim 9 wherein the method includes the steps of:
    (c) identifying positions of maximum amplitude of vibration modes of interest; and
    (d) locating at least one of said tuned dampers at an identified position of maximum amplitude.

11. A method of damping as claimed in claim 10 wherein the method further includes prior to step (c) the further steps of:
    (a) identifying frequencies to be damped;
    (b) identifying any modes of vibration of the pipe for said frequencies to be damped.

12. A method of damping as claimed in claim 9 wherein the method further includes the step of selecting an appropriate thickness of insulation material based on the pipes maximum temperature to give a required drop in temperature between the pipe and the damper.

* * * * *